United States Patent
Rivest

(10) Patent No.: US 8,266,811 B2
(45) Date of Patent: Sep. 18, 2012

(54) MULTIAXIAL UNITARY ALIGNMENT APPARATUS

(75) Inventor: Zachary J. Rivest, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 329 days.

(21) Appl. No.: 12/611,251

(22) Filed: Nov. 3, 2009

(65) Prior Publication Data

US 2011/0099825 A1 May 5, 2011

(51) Int. Cl.
B23Q 1/25 (2006.01)
F16C 11/10 (2006.01)
(52) U.S. Cl. .............................. 33/608; 33/569; 269/71
(58) Field of Classification Search .................... 33/533, 33/568, 569, 570, 600, 608, 645; 248/542, 248/543; 269/55, 59, 71; 403/27
See application file for complete search history.

(56) References Cited

U.S. PATENT DOCUMENTS

| | | | |
|---|---|---|---|
| 2,676,414 A * | 4/1954 | Derry | 33/534 |
| 3,824,744 A * | 7/1974 | Petrant | 451/387 |
| 4,549,359 A * | 10/1985 | Hense et al. | 33/516 |
| 4,782,599 A * | 11/1988 | Bergstrom | 33/608 |
| 5,118,058 A * | 6/1992 | Richter | 248/183.2 |
| 5,271,651 A * | 12/1993 | Blatt et al. | 269/71 |
| 5,533,274 A * | 7/1996 | Westling | 33/600 |
| 5,609,645 A * | 3/1997 | Vinciguerra | 623/20.28 |
| 5,829,146 A * | 11/1998 | Watson | 33/288 |
| 5,984,291 A * | 11/1999 | Iwata et al. | 269/73 |
| 6,364,564 B1 * | 4/2002 | Chaniot et al. | 403/131 |
| 6,736,385 B1 * | 5/2004 | Beffrieu | 269/49 |
| 7,398,965 B2 * | 7/2008 | Glaser et al. | 269/71 |
| 2005/0223919 A1 * | 10/2005 | Oleson | 101/127.1 |
| 2008/0235970 A1 * | 10/2008 | Crampton | 33/503 |
| 2009/0184449 A1 * | 7/2009 | Drees | 269/71 |

* cited by examiner

Primary Examiner — R. A. Smith

(57) ABSTRACT

An adjustable alignment apparatus for a gage that fits to a vehicle body includes a base having first, second, and third abutment faces and an adjusting plate having first, second, and third walls respectively spaced from the first, second, and third abutment faces. An adjusting bolt acts between the base and the adjusting plate to move the walls of the adjusting plate respectively toward and away from the walls of the base. A first mounting bracket engages with the vehicle body and is attached to one of the base and the adjusting plate. A second mounting bracket engages with the gage and is attached to the other of the base and the adjusting plate. A plurality of shims can be removeably installed and uninstalled between the abutment faces of the base and the walls of the adjusting plate to adjust the position of the gage relative the vehicle body.

13 Claims, 3 Drawing Sheets

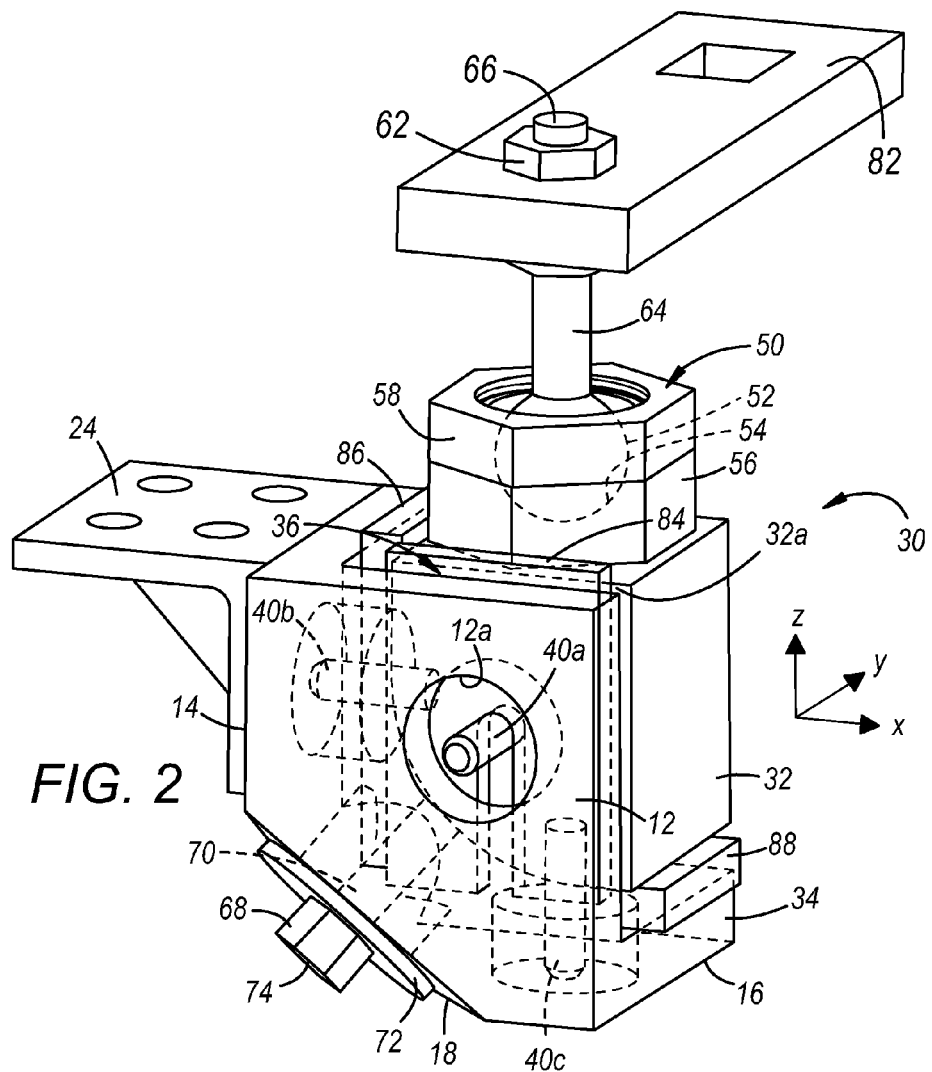
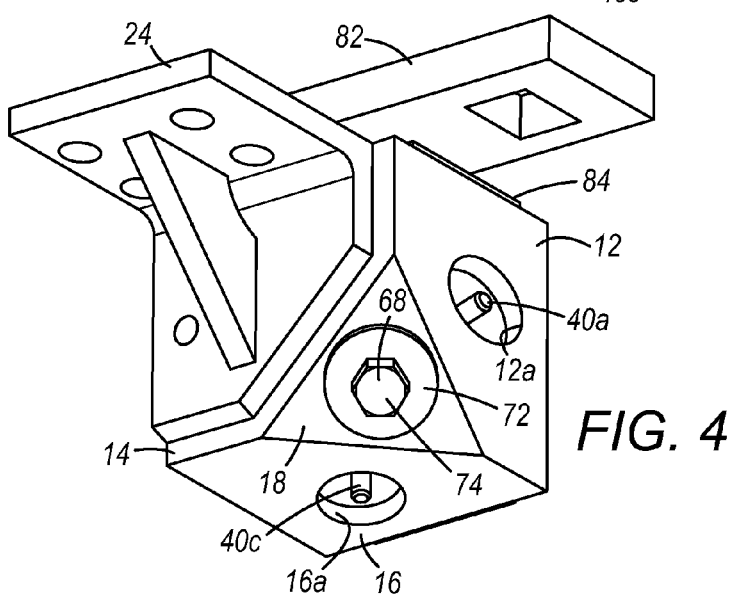

MULTIAXIAL UNITARY ALIGNMENT APPARATUS

FIELD OF THE INVENTION

The present invention relates to a gage for checking the location of the surfaces and edges of body panels in vehicle bodies and more particularly provides an adjustable alignment apparatus for adjustably aligning the gage relative to the body panels.

BACKGROUND OF THE INVENTION

A motor vehicle body is assembled from a number of individually manufactured components such as fenders, hoods, fascia panels, grilles, and lamp assemblies. These individual components must be precisely designed, manufactured, and assembled so that the adjoining surfaces are flush and the adjoining edges are precisely gapped apart in order to meet customer expectations for high quality fit and finish.

It is known to use a gage during the prototyping of vehicle bodies. The gage is precisely sized and shaped to simulate the shape of a component and can be used to check the accuracy of the surrounding components. In some cases, the gage is fitted with measurement studs that are sensed by a CMM (Coordinate Measuring Machine) in order to collect highly accurate data relative to the location of the gage in relation to the assembled components.

It would be desirable to provide a new and improved adjustable alignment apparatus by which a gage is adjustably aligned with the adjacent vehicle body panels.

SUMMARY OF THE INVENTION

An adjustable alignment apparatus for a gage that fits to a vehicle body includes a base having first, second, and third abutment faces and an adjusting plate having first, second, and third walls respectively spaced from the first, second, and third abutment faces. An adjusting bolt acts between the base and the adjusting plate to move the walls of the adjusting plate respectively toward and away from the walls of the base. A first mounting bracket engages with the vehicle body and is attached to one of the base and the adjusting plate. A second mounting bracket engages with the gage and is attached to the other of the base and the adjusting plate. A plurality of shims can be removeably installed and uninstalled between the abutment faces of the base and the walls of the adjusting plate to adjust the position of the gage relative the vehicle body.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 2 is a perspective view showing the assembled alignment apparatus.

FIG. 4 is another perspective view of the assembled alignment apparatus.

DETAILED DESCRIPTION OF THE EXEMPLARY EMBODIMENTS

The following description of certain exemplary embodiments is merely exemplary in nature and is not intended to limit the invention, its application, or uses.

Figure 3:
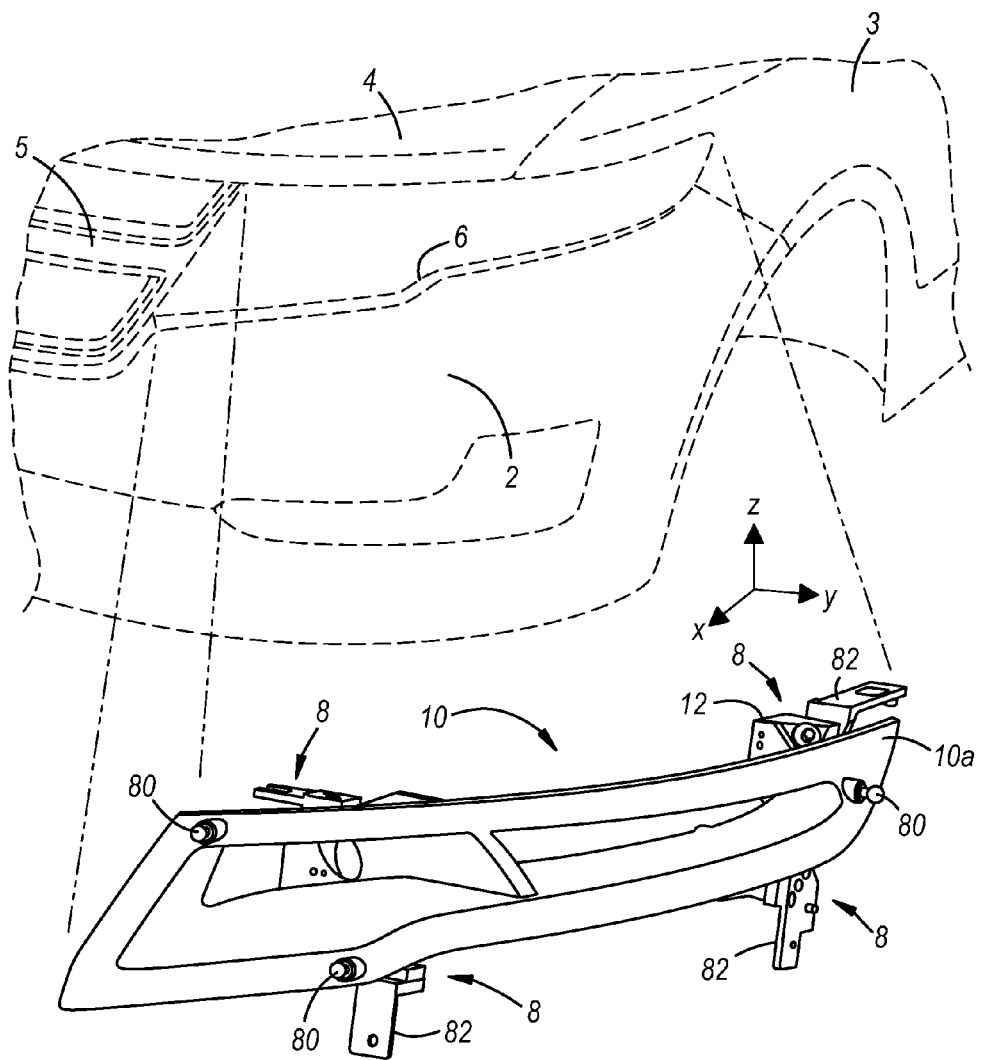
FIG. 3 is an exploded showing a typical gage employing the alignment apparatus of FIGS. 1 and 2.

Referring to FIG. 3, a vehicle body is assembled from individually manufactured components including a molded plastic fascia 2, a fender 3, an engine compartment hood 4, and a grille 5, that are assembled together and define an opening 6 for receiving a headlamp assembly, not shown.

A gage 10 is provided in the shape of the headlamp assembly that will be installed within the opening 6. The gage 10 has surfaces that will be flush with the adjacent surfaces of the molded plastic fascia 2, fender 3, hood 4, and grille 5 if the various components are accurately manufactured and assembled. The gage 10 also has edges that will be uniformly gapped from the adjoining edges of the fascia 2, fender 3, hood 4, and grille 5 if the various components are accurately manufactured and assembled.

Figure 1:
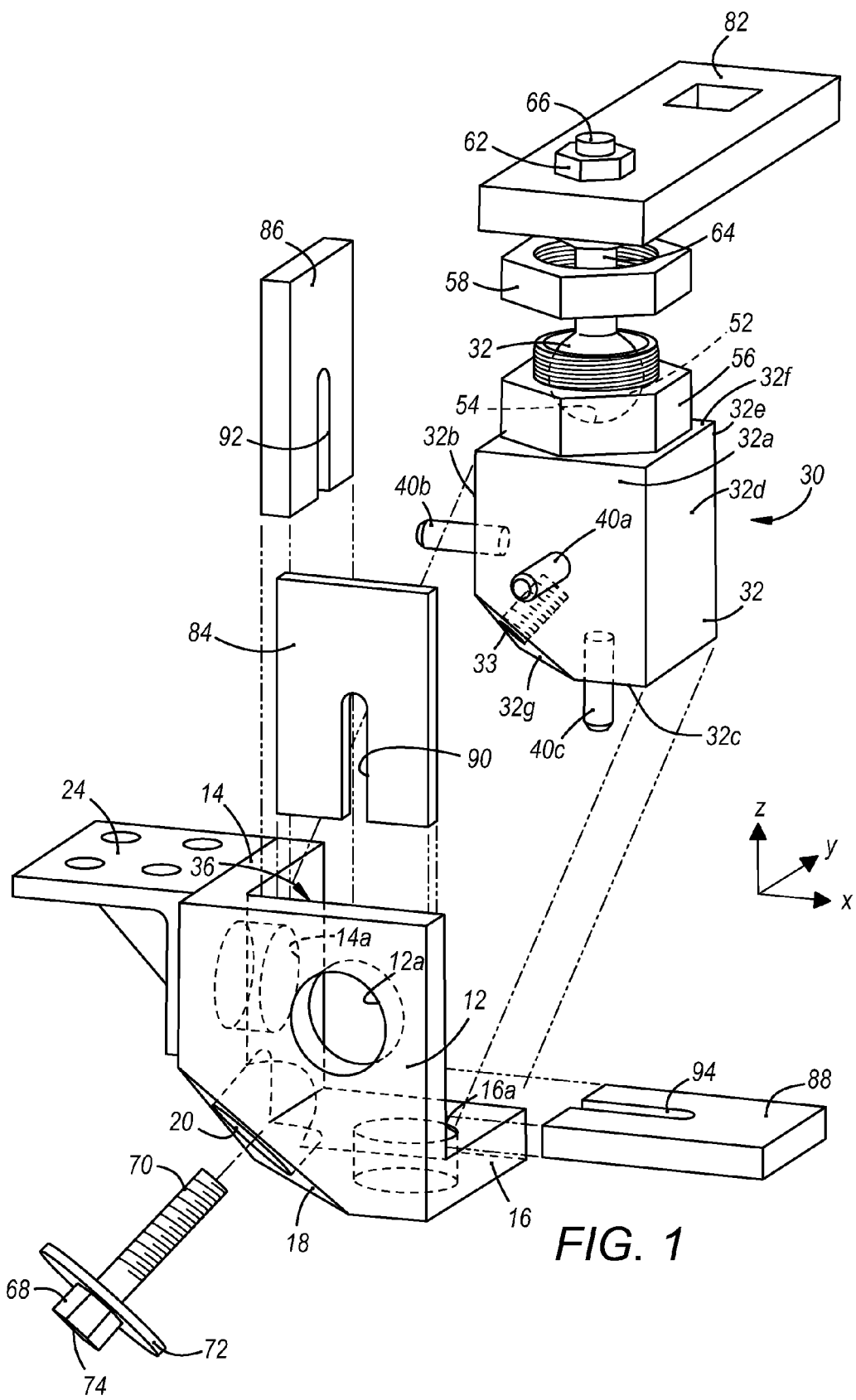
FIG. 1 is an exploded view showing the component parts of the alignment apparatus.

FIGS. 1, 2 and 3 show an adjustable alignment apparatus, generally indicated at 8, that can be used to adjustably mount and align the gage 10 within the opening 6. As best seen in FIG. 1, the gage 10 includes a base, generally indicated at 30, an adjusting plate, generally indicated at 36, and a swivel, generally indicated at 50.

The base 30 is a cube-shaped base member 32 of six sides including front face 32a, left face 32b, bottom face 32c, right face 32d, back face 32e, and top face 32f. The corner of the cube at the intersection of the front face 32a, left face 32b, and bottom face 32c is removed to provide angled face 32g. A threaded hole 33 is provided in the angled face 32g. A locating pin 40a is seated in the center of front face 32a and projects outwardly therefrom. A locating pin 40b is seated in the center of left face 32b and projects outwardly therefrom. A locating pin 40c is seated in the center of bottom face 32c and projects outwardly therefrom.

The adjusting plate 36 is angle-shaped, as best seen in FIG. 1, and includes a front wall 12, left wall 14 and bottom wall 16. The adjusting plate 36 has an angled wall 18 at the intersection of the front wall 12, left wall 14 and bottom wall 16. An oversized hole 20 is provided in the angled wall 18. An oversized hole 12a is provided in front wall 12 and aligns with the locating pin 40a. An oversized hole 14a is provided in left wall 14 and aligns with the locating pin 40b. And an oversized hole 16a is provided in the bottom wall 16 and aligns with the locating pin 40c. A mounting bracket 24 is attached to the left wall 14 of adjusting plate 36 and is attached to the gage 10.

The swivel assembly 50 mounts a mounting bracket 82 on the base 30. The swivel assembly 50 includes a ball 52 and socket 54. The socket 54 includes a socket bottom 56 which is welded to the top face 32f of the base member 32, and a socket cap 58 that threads onto the socket bottom 56 to capture the ball 52 in socket 54. The ball 52 has a stem 64 with a threaded end 66 that extends through a hole in the mounting bracket 82 and receives a nut 62. Thus the swivel assembly 50 mounts the mounting bracket 82 for swiveling movement relative to the base member 32.

An adjusting bolt 68 is provided between the base member 32 and the adjusting plate 36 to move the walls 12, 14 and 16 toward and away from the adjacent faces 32a, 32b, and 32c of the base member 32. The adjusting bolt 68 has a head 74 by which the adjusting bolt 68 is rotated to thread a threaded shank 70 of the adjusting bolt 68 into the threaded hole 33 of the angled face 32g of the base member 32.

As best seen in FIGS. 1 and 2, shims 84, 86 and 88 are provided for installation between the adjusting plate 36 and the base member 32. Shim 84 is installed between the front wall 12 of the adjusting plate 36 and the front face 32a of the base member 32. Shim 84 has a slot 90 that fits over the locating pin 40a projecting from the base member 32 so that the locating pin 40a locates the position of the shim 84. Shim 86 is installed between the left wall 14 of the adjusting plate 36 and the left face 32b of the base member 32. Shim 86 has a slot 92 that fits over the locating pin 40b to locate the position of the shim 86. Shim 88 is installed between the bottom wall 16 of the adjusting plate 36 and the bottom face 32c of the base member 32. Shim 88 has a slot 94 that fits over the locating pin 40c to locate the position of the shim 88. With the shims inserted, the adjusting bolt 68 is rotated to tighten the adjusting plate 36 in the direction toward the base member 32 and thereby clamp the shims 84, 86, and 88 between the adjusting plate 36 and the base member 32. The oversize holes 12a, 14a, and 16a permit adjusting movement of the walls 12, 14 and 16 without interference with the locating pins 40a, 40b, and 40c.

Referring again to FIG. 3, it is seen that the gage 10 has several of the adjustable alignment apparatuses 8 mounted thereon. In each case, the mounting bracket 24 is attached to the gage 10 and the mounting bracket 82 will be located on and suitably attached to the fascia 2, fender 3, hood 4 or the grille 5 in order to locate the gage 10 on the vehicle body. The gage 10 has a plurality of measurement studs 80 thereon which will be sensed by the CCM machine in order to collect data relative to the alignment of the gage 10 within the vehicle body opening 6.

The adjustable alignment apparatuses 8 permit adjustment of the position of the gage 10 along the X, Y and Z axes with respect to the vehicle body by changing the number of shims and the thickness of the shims that are installed between the adjusting plate 36 and the base 30. For example, in FIG. 1, the shims 84, 86 and 88 can be selected from a package of shims having thicknesses of, for example, 1 mm, 2 mm, 3 mm etc. In addition, two or more shims can be stacked atop one another and positioned upon the locating pins 40a, 40b, and 40c as needed to accomplish the desired degree of adjustment. In each case, the adjusting bolt 68 will be loosened so that shims can be removed or inserted. Then the adjusting bolt 68 is tightened to closely capture the shims and thereby accomplish an adjustment of the mounting bracket 82 relative to the mounting bracket 24. Adjustment of the shims will thereby adjust the position of the gage 10 upon the vehicle body. In addition, the mounting bracket 82 can swivel about the ball 52 in order to adjust the angular position of the mounting bracket 82.

Thus, the invention provides a new and improved adjustable alignment apparatus 8 for mounting a gage 10 upon the body panels of a motor vehicle. Although the drawings herein show the mounting bracket 24 attached to the adjusting plate 36, and show the mounting bracket 82 attached to the base 30 by the swivel assembly 50, it will be understood that the alignment apparatus 8 can alternatively have the mounting bracket 24 attached to the base member 32 and the mounting bracket 82 attached to the adjusting plate 36. Furthermore, in FIG. 1, the swivel assembly 50 could be mounted upon the adjusting plate 36 instead of being mounted on the base member 32. Although FIG. 3 shows the use of four of the adjustable alignment apparatuses, any number can be employed as needed.

Having thus described the invention, what is claimed as new and desired to be secured by Letters Patent is as follows:

1. An adjustable alignment apparatus for a gage that fits to a vehicle body, comprising:
    a base having first, second, and third abutment faces;
    an adjusting plate having first, second, and third walls that are respectively spaced from the first, second, and third abutment faces of the base;
    an adjusting bolt acting between the base and the adjusting plate to move the first, second and third wall of the adjusting plate respectively toward and away from the first, second and third abutment faces of the base;
    a first mounting bracket for engagement with the vehicle body and attached to one of the base and the adjusting plate;
    a second mounting bracket for engagement with the gage and attached to the other of the base and the adjusting plate;
    and a plurality of shims removeably installed and uninstalled between the first, second, and third abutment faces of the base and the first, second, and third walls of the adjusting plate to adjust the position of the gage relative the vehicle body.

2. The adjustable alignment apparatus of claim 1 further comprising a ball and swivel attaching the first mounting bracket and the one of the base and adjusting plate to allow swiveling movement of the first mounting bracket.

3. The adjustable alignment apparatus of claim 1 further comprising the adjusting bolt extending through an oversize hole in the adjusting plate and threadedly engaging a threaded hole in the base so that the location of the adjusting plate can be varied to clamp a varied number and thickness of the plurality of shims between the walls of the adjusting plate and the abutment faces of the base.

4. The adjustable alignment apparatus of claim 1 further comprising the plurality of shims having slots therein and at least one of the first, second and third faces of the base having a shim locating pin projecting therefrom to extend through the slot and locate the plurality of shims upon the base.

5. The adjustable alignment apparatus of claim 4 further comprising the projecting locating pin projecting a distance from the base and the wall of the adjusting plate adjacent the projecting locating pin having an oversize hole therein to receive the projecting locating pin without interference between the locating pin and the wall of the adjusting plate.

6. The adjustable alignment apparatus of claim 1 further comprising each of the shims having slots therein and first, second, and third shim locating pins projecting respectively from the first, second, and third abutment faces of the base and through the slots of the plurality of shims to locate the plurality of shims upon the base.

7. The adjustable alignment apparatus of claim 6 further comprising the first, second, and third walls of the adjusting plate each having therein an oversize hole to allow the adjusting movements of the adjusting plate without interference with the projecting locating pins.

8. An adjustable alignment apparatus for a gage that fits to a vehicle body, comprising:
    a base having first, second, and third abutment faces;
    an adjusting plate having first, second, and third walls that are respectively spaced from the first, second, and third abutment faces of the base;
    an adjusting bolt extending through an oversize hole in the adjusting plate and threaded into a threaded hole in the base so that rotation of the adjusting bolt adjust the position of the first, second and third walls of the adjusting plate respectively toward and away from the first, second and third abutment faces of the base;

a first mounting bracket for engagement with the vehicle body and attached to one of the base and the adjusting plate;

a second mounting bracket for engagement with the gage and attached to the other of the base and the adjusting plate;

a ball and swivel attaching the first mounting bracket and the one of the base and adjusting plate to allow swiveling movement of the first mounting bracket;

and a plurality of shims removeably installed and uninstalled between the first, second, and third abutment faces of the base and the first, second, and third walls of the adjusting plate to adjust the position of the gage relative the vehicle body.

9. The adjustable alignment apparatus of claim 8 further comprising the plurality of shims having slots therein and at least one of the first, second, and third abutment faces of the base having a shim locating pin projecting therefrom to extend through the slots and locate the plurality of shims upon the base.

10. The adjustable alignment apparatus of claim 8 further comprising each of the plurality of shims having slots therein and first, second, and third shim locating pins projecting respectively from the first, second, and third abutment faces of the base and through the slots of the plurality of shims to locate the plurality of shims upon the base.

11. The adjustable alignment apparatus of claim 10 further comprising the first, second, and third walls of the adjusting plate each having therein an oversize hole to allow the adjusting movements of the adjusting plate without interference with the projecting locating pins.

12. An adjustable alignment apparatus for a gage that fits to a vehicle body, comprising:

a base having first, second, and third abutment faces;

first, second and third locating pins projecting respectively from the first, second and third abutment faces of the base;

an adjusting plate having first, second, and third walls that are respectively spaced from the first, second, and third abutment faces of the base;

an adjusting bolt extending through an oversize hole in the adjusting plate and threaded into a threaded hole in the base so that rotation of the adjusting bolt adjust the position of the first, second and third walls of the adjusting plate respectively toward and away from the first, second and third abutment faces of the base;

a first mounting bracket for engagement with the vehicle body;

a ball and swivel attaching the first mounting bracket on the base to allow swiveling movement of the first mounting bracket;

a second mounting bracket for engagement with the gage and attached to the adjusting plate;

and a plurality of shims removeably installed and uninstalled between the first, second, and third abutment faces of the base and the first, second, and third walls of the adjusting plate to adjust the position of the gage relative the vehicle body, each of the plurality of shims having a locating slot therein receiving a locating pin projecting from the base to locate the plurality of shims between the base and the adjusting plate.

13. The adjustable alignment apparatus of claim 12 further comprising the first, second, and third walls of the adjusting plate each having therein an oversize hole to allow the adjusting movements of the adjusting plate without interference with the projecting locating pins.

\* \* \* \* \*